(12) United States Patent
Oda

(10) Patent No.: US 7,648,200 B2
(45) Date of Patent: Jan. 19, 2010

(54) HEADREST DEVICE

(75) Inventor: Shigeo Oda, Hiroshima (JP)

(73) Assignee: Toyoshi Fukuda, Ann Arbor, MI (US)

( * ) Notice: Subject to any disclaimer, the term of this patent is extended or adjusted under 35 U.S.C. 154(b) by 65 days.

(21) Appl. No.: 11/901,655

(22) Filed: Sep. 18, 2007

(65) Prior Publication Data

US 2008/0290713 A1    Nov. 27, 2008

(30) Foreign Application Priority Data

May 25, 2007    (JP) .............................. 2007-138938

(51) Int. Cl.
*B60N 2/42*    (2006.01)
(52) U.S. Cl. ................... 297/216.12; 297/408
(58) Field of Classification Search ............ 297/216.12, 297/408
See application file for complete search history.

(56) References Cited

U.S. PATENT DOCUMENTS

| | | | | |
|---|---|---|---|---|
| 4,256,341 A | * | 3/1981 | Goldner et al. ............. | 297/410 |
| 4,674,792 A | * | 6/1987 | Tamura et al. .............. | 297/408 |
| 4,779,929 A | * | 10/1988 | Kuchemann ................ | 297/408 |
| 5,290,091 A | * | 3/1994 | Dellanno et al. ............ | 297/391 |
| 5,738,412 A | * | 4/1998 | Aufrere et al. .............. | 297/408 |
| 5,820,211 A | * | 10/1998 | Heilig et al. ........... | 297/216.12 |
| 5,842,738 A | * | 12/1998 | Knoll et al. ............ | 297/216.12 |
| 5,934,750 A | * | 8/1999 | Fohl ....................... | 297/216.12 |
| 5,992,937 A | * | 11/1999 | Pilhall ........................ | 297/408 |
| 6,045,181 A | * | 4/2000 | Ikeda et al. ............ | 297/216.12 |
| 6,079,776 A | * | 6/2000 | Breitner et al. ........ | 297/216.12 |
| 6,213,548 B1 | * | 4/2001 | Van Wynsberghe et al. ...... | 297/216.12 |
| 6,290,298 B1 | * | 9/2001 | Lee ........................... | 297/408 |
| 6,412,872 B2 | * | 7/2002 | Takeda et al. .............. | 297/391 |
| 6,513,871 B2 | * | 2/2003 | Bartels ................. | 297/216.12 |
| 6,550,856 B1 | * | 4/2003 | Ganser et al. ................. | 297/61 |
| 6,830,278 B2 | * | 12/2004 | Yoshizawa et al. ......... | 296/68.1 |
| 7,008,019 B2 | * | 3/2006 | Lampke et al. ............... | 297/408 |
| 7,284,793 B2 | * | 10/2007 | Klühspies et al. ...... | 297/216.12 |
| 7,438,357 B2 | * | 10/2008 | Becker et al. .......... | 297/216.12 |

FOREIGN PATENT DOCUMENTS

| | | |
|---|---|---|
| JP | 2006182276 | 7/2006 |
| JP | 2007055500 | 3/2007 |

* cited by examiner

*Primary Examiner*—Laurie K Cranmer
(74) *Attorney, Agent, or Firm*—Young Basile Hanlon & MacFarlane, PC

(57) ABSTRACT

A headrest device for supporting a headrest with respect to a seat. A lower frame is connectable to the seat, and an upper frame is provided for supporting the headrest thereon. A pair of link brackets connects the lower frame to the upper frame for pivotal motion of the upper frame with respect to the lower frame through a limited range of motion between a forward tilt limit position and a rearward tilt limit position. A motor is operatively connected one of the link brackets to move the upper frame between the forward tilt limit position and the rearward tilt limit position in response to a control signal.

16 Claims, 10 Drawing Sheets

HEADREST DEVICE

CROSS-REFERENCE TO RELATED APPLICATIONS

This application claims the benefit of Japanese Patent Application 2007-138938, filed May 25, 2007.

FIELD OF THE INVENTION

The invention relates to the field of headrests for automobiles, and more particularly, the invention relates to a headrest device that supports a headrest with respect to a car seat and is adapted to move the headrest with respect to the car seat.

BACKGROUND OF THE INVENTION

In light of the ever-rising number of automobile collisions, a great deal of research has been conducted on ways to reduce the severity of injuries sustained by passengers in an automobile during an automobile collision. In particular, efforts have been directed toward developing headrests that reduce the severity of whiplash injuries. Examples of such devices are shown in Japanese Patent Application Publication No. 2006-182276 and Japanese Patent Application Publication No. 2007-55500, both of which disclose use of a sensor to detect the distance to an adjacent vehicle. Based upon the distance to an adjacent vehicle, a computer determines whether a collision is imminent, and, if so, tilts the headrest forward. Moving a headrest forward during an automobile collision is known to reduce the severity of whiplash injuries by reducing movement of the vehicle occupant's head in a backward direction. In particular, when a collision occurs, the vehicle occupant's head shifts forward, then immediately after, the vehicle occupant's head moves backward. When the vehicle occupant's head moves backward, a huge force is applied to the vehicle occupant's neck, which causes whiplash. Accordingly, known active headrest devices move the headrest forward to help reduce the extent of backward movement of the head during a collision to help mitigate the whiplash effect.

Also, there are known headrests that include means to adjust the height of the headrest. For example, the driver can get a better rear view if the headrests in the back seats of the vehicle are lowered. Passengers in the back seat can get a better front view if the headrest of the front passenger seat is lowered. Furthermore, the driver can get a better side view if the headrest of the front passenger seat is lowered. Also, in case if there are three rows of seat in a car, by lowering the headrest in the middle row, both front and rear view will be improved. However, the known headrest devices have complicated structures that are costly to produce. Also, these complicated structures can lead to various problems, such as frequent device failure, lowered reliability and increased maintenance costs. Furthermore, known headrests that can change their height still block the view because of the presence of the headrest itself on the car seat.

For the problem of whiplash injury, the most important solution is to move the headrest forward without fail whenever there arises a danger of collision. Therefore, a low cost reliable headrest device with such function is desired.

Accordingly, it would be desirable to have a headrest device that includes a simple, yet reliable structure operative to move the headrest in the event of a collision or in order to reduce the sight obstruction caused by the headrest.

SUMMARY OF THE INVENTION

The invention provides a headrest device includes a headrest that is installed on a car seat by an upper frame and a lower frame. The headrest device can reduce injury, such as whiplash, that might occur to a person in a car at the time of a collision by tilting the headrest forward in response to a signal emitted from a control unit that responds to a sensor that monitors the distance between the car and a nearby vehicle.

One headrest device taught herein includes a lower frame that is connectable to a seat, and an upper frame for supporting a headrest thereon. A pair of link brackets connects the lower frame to the upper frame for pivotal motion of the upper frame with respect to the lower frame through a limited range of motion between a forward tilt limit position and a rearward tilt limit position. A motor may be provided for moving the upper frame between the forward tilt limit position and the rearward tilt limit position in response to a control signal, wherein the motor is operatively connected one of the link brackets. Furthermore, a controller for determining when a collision is imminent and generating the control signal in response thereto.

The headrest device may also include a horizontal bar rigidly connected to either the upper frame or the lower frame, and a gear is disposed upon the horizontal bar for rotation with respect the horizontal bar. The gear is rigidly connected to the link bracket, and the gear is operatively connected to the motor for rotation thereby. Also, a worm may be connected to the motor and in engagement with the gear for rotating the gear in response to rotation of the motor.

Additionally, a ratchet gear and pawl may be provided, wherein the ratchet gear is fixed coaxially to the gear and the pawl is engageable with the ratchet gear for restricting the upper frame against pivoting with respect to said lower frame toward the rearward tilt limit position.

DETAILED DESCRIPTION OF THE INVENTION

Figure 1:
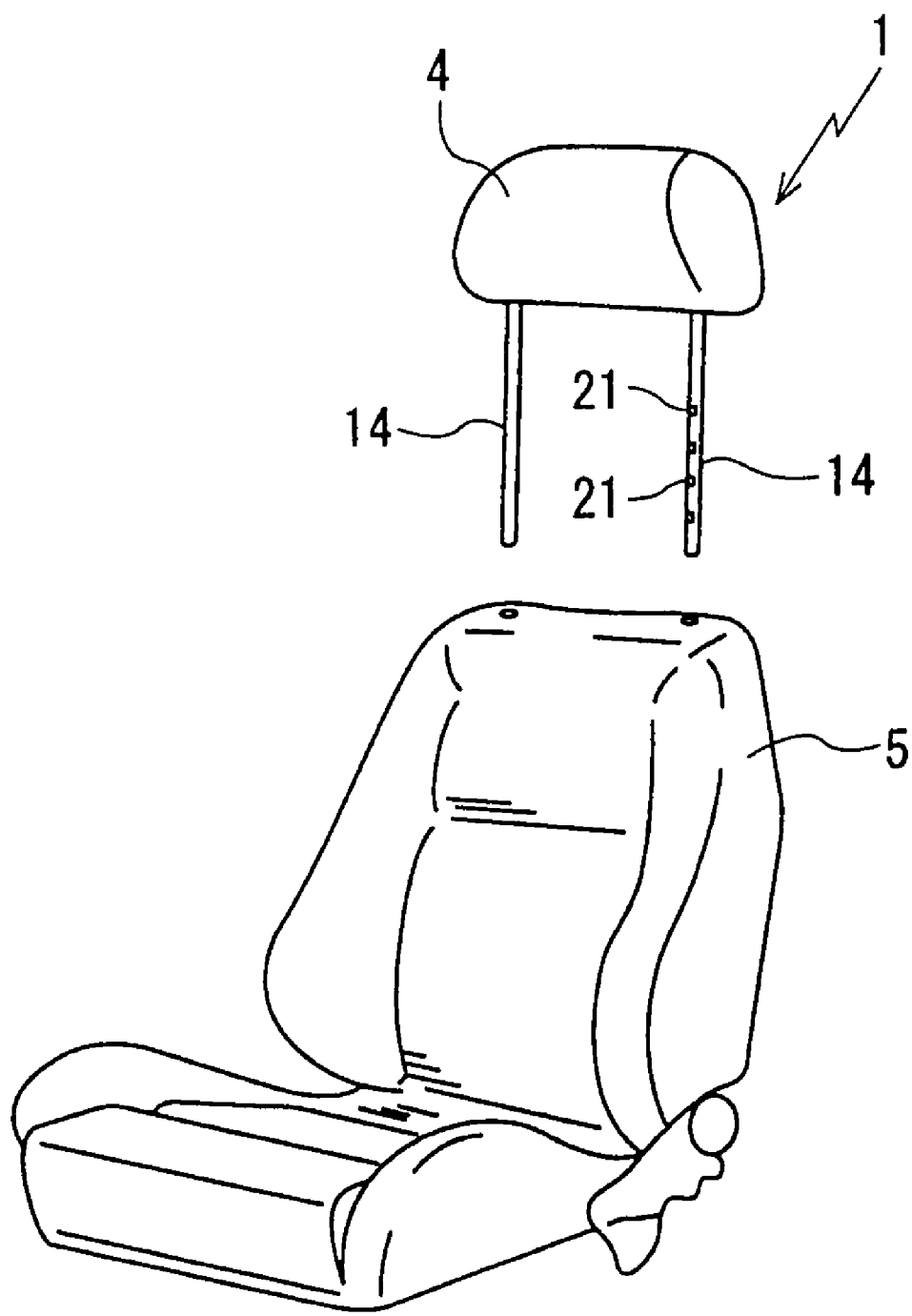
FIG. 1 is a perspective view of the headrest device according to a first embodiment of the invention before installation on a car seat.

Referring to the drawings, the invention will be seen to most generally comprise a headrest device that includes an upper frame that is movable with respect to a lower frame by a motor in response to a signal from a control unit, wherein a pair of link brackets restrain the range of motion of the upper frame with respect to the lower frame of the headrest device, as will now be described in detail with reference to the disclosed embodiments.

FIG. 1 shows a headrest device 1 according to the first embodiment of the invention. The headrest device 1 includes a headrest 4 that is installed on a car seat 5. In particular, a pair of upright leg sections 14 is connected to the headrest 4 to adjustably connect the headrest 4 to the car seat 5. Adjustment of the headrest 4 with respect to the car seat 5 is provided by a plurality of recesses 21 that are formed on one of the upright leg sections 14 for engagement with a protrusion (not shown) that is provided on the car seat 5 for engagement with the recesses 21.

Figure 2:
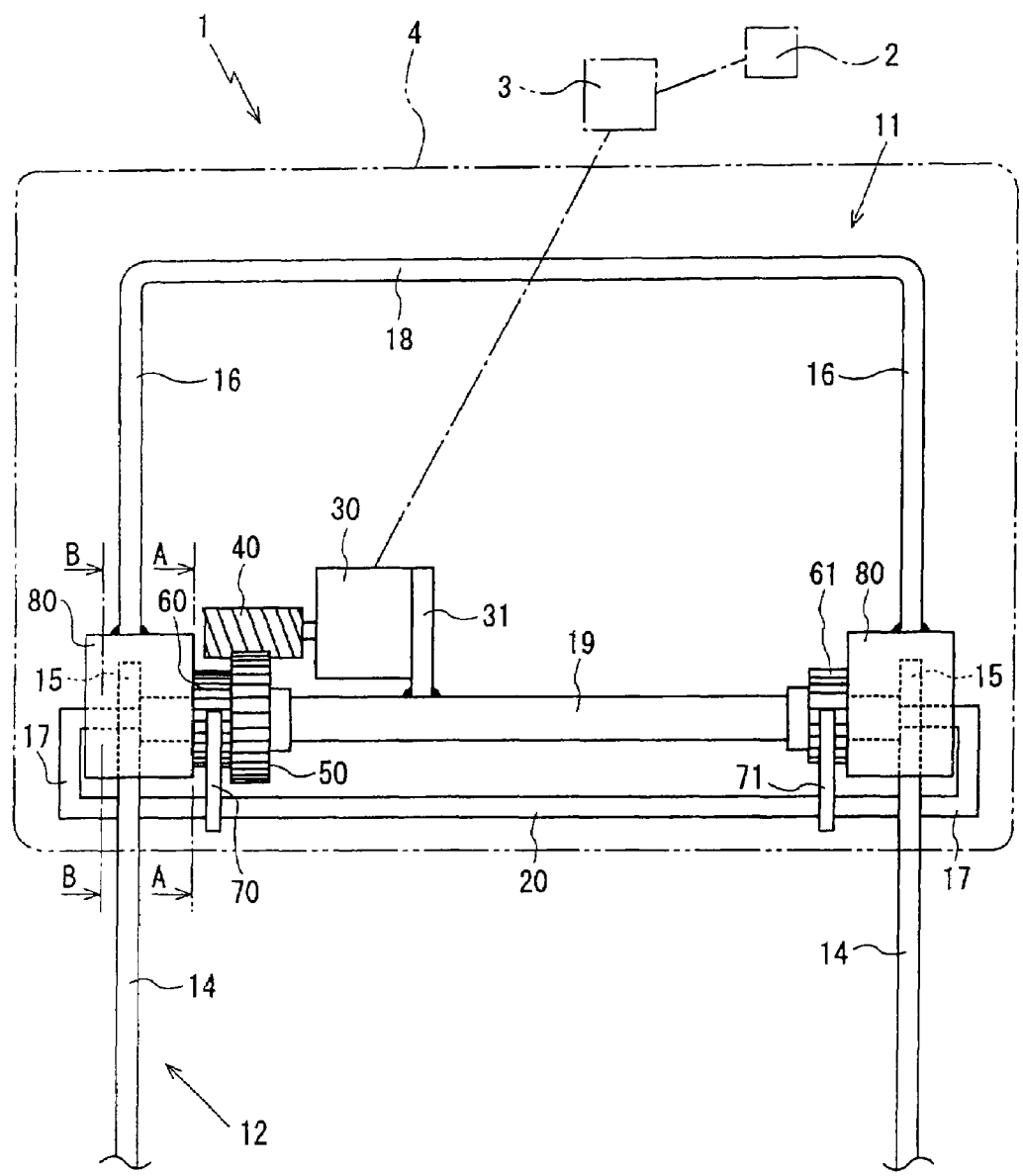
FIG. 2 is a rear view of the headrest device shown in FIG. 1.

As shown in FIG. 2, the headrest device 1 includes a sensor 2 and a control unit, or CPU, 3. The sensor 2 is operative to detect the distance between the car and an adjacent vehicle and to output a corresponding signal to the CPU 3. The CPU 3 evaluates the information provided to it by the sensor 2. Based upon the information provided to the CPU 3 by the sensor 2, the CPU 3 is operative to output a signal when a potential collision is detected to change the position of the headrest 4 to reduce the degree of injuries such as whiplash experienced by the occupants of the car as a result of the collision, as will be explained in detail herein.

So that the headrest 4 may be tilted, an upper frame 11 and a lower frame 12 cooperate to support the headrest 4 of the headrest device 1. The upper frame 11 is connected to the lower frame 12 for free rotation of the upper frame 11 with respect to the lower frame 12. The lower frame 12 includes the two upright like sections 14 that are attached to the upper portion of the car seat 5. The upright like sections 14 are adjustably connected to the car seat 5 so that the height of the headrest 4 with respect to the car seat 5 may be adjusted. Each of the two upright like sections 14 has an upper end 15 opposite the car seat 5. Near the upper ends 15 of the upright leg sections 14, a horizontal bar 19 connects the two upright leg sections 14 to one another. The lower frame 12 also includes a support shaft 20 that is connected to the horizontal bar 19 via a connector 17, which extends substantially perpendicular to the support shaft 20 and the horizontal bar 19.

The upper frame 11 is disposed within the headrest 4 above the two upright leg sections 14. The upper frame 11 includes two forwardly tilted like sections 16 and a connecting section 18 that extends between the upper ends of the two forwardly tilted leg sections 16 and connects the two forwardly tilted leg sections 16 to one another.

As shown and described herein, the upper and lower frames 11, 12 are fabricated from round bars, but they could also be fabricated from square bars. The frames can be fabricated from metals, plastics, or combinations thereof, so long as the material selected provides suitable hardness and strength for the upper and lower frames 11, 12.

The headrest 4 is installed on the car seat and is supported by the upper and lower frames 11, 12 in such a way that the top portion of the lower frame 12 and the entirety of the upper frame 11 are covered by the headrest 4. On one of the upright leg sections 14, the plurality of recesses 21 are provided to allow adjustment of the height of the headrest 4.

The motor 30 is connected to the horizontal bar 19 by a mounting plate 31. The motor is electrically connected to the CPU 3 and operates in response to a signal from the CPU 3. A worm 40 is connected to the drive shaft of the motor 30 so that it rotates by the operated of the motor 30. A gear wheel 50 is disposed on the horizontal bar 19 on the side of one of the upright leg sections 14 for rotation with respect to the horizontal bar 19. The gear wheel 50 engages the worm 40 so that the motor 30 can rotate the gear wheel 50 using the worm 40. The side surface of the gear wheel 50 is fixed to one of the link brackets 80 via the ratchet gear 60. However, it would be possible to fix the side surface of the gear wheel 50 directly on the side surface of the side link bracket 80.

The ratchet gear 60 is connected coaxially to the gear wheel 50 and is thus disposed on the horizontal bar 19 for rotation with respect to the horizontal bar 19. Thus, the ratchet gear 60 rotates around the horizontal bar 19 synchronously with the gear wheel 50. In order to prevent interference of the ratchet gear 19 with the worm 40, the diameter of the ratchet gear 60 is smaller than the diameter of the gear wheel 50.

Figure 3:
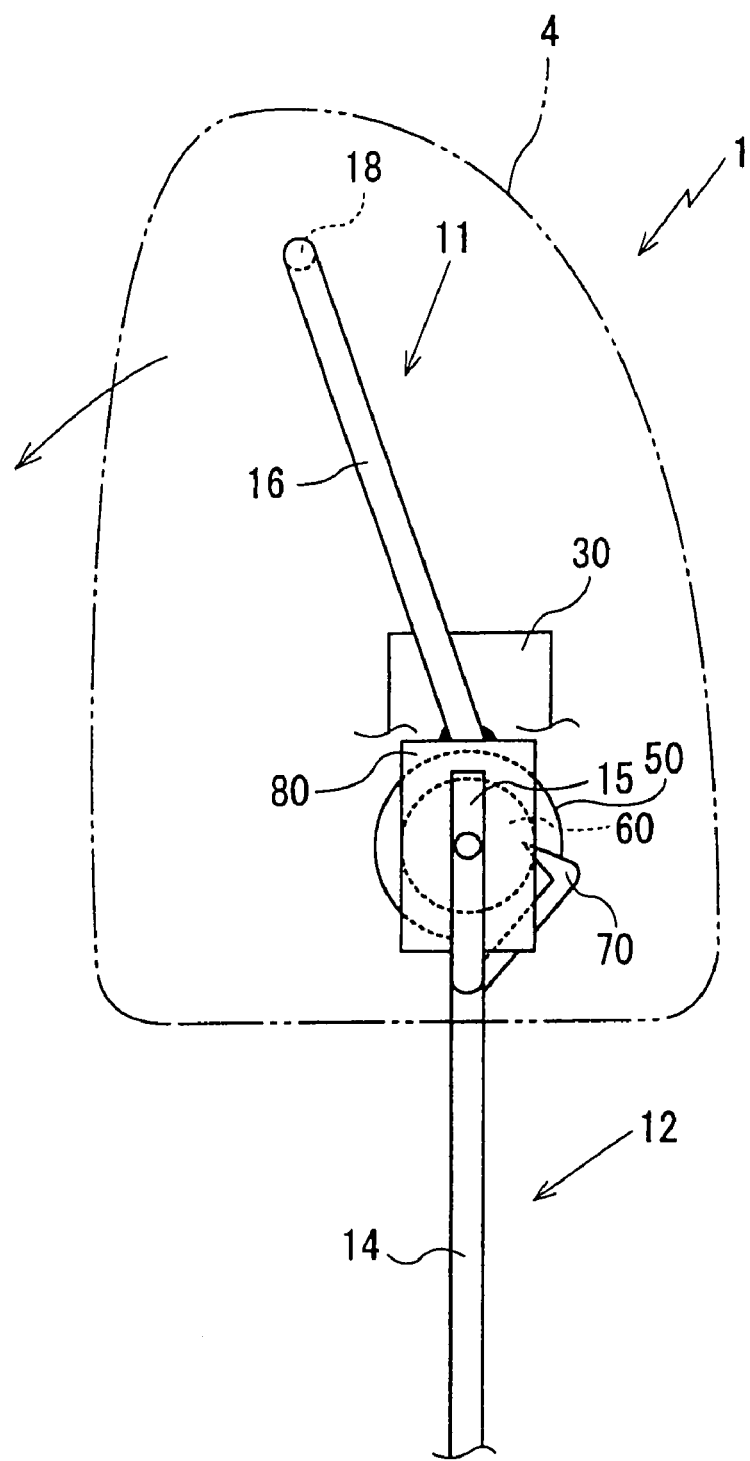
FIG. 3 is a side view of the headrest device shown in FIG. 1.

The pawl 70 is installed on the support shaft 20 below the horizontal bar 19 of the lower frame 12, engages with the ratchet gear 60 to restrain the gear wheel 50 against reverse rotation, which is the rotation of the gear wheel 50 in the direction (clockwise in FIG. 3) that makes the upper frame 11 tilt backward.

The left and right link brackets 80 are fixed to the lower ends of the two tilted leg sections 16 of the upper frame 11, and the upper ends 15 of the upright leg sections 14 are disposed within the link brackets 80 to provide a pivotal connection between the upper frame 11 and the lower frame 12. In order to restrain the range of motion of the upper frame 11 with respect to the lower frame 12, a forward tilt limit surface 81a, 81b and a backward tilt limit surface 82a, 82b are provided in the interior of the link brackets 80. Accordingly, engagement of the front surface and the back surface of the upper ends 15 of the upright leg sections 14 with the forward and backward tilt limit surfaces 81a, 81b, 82a, 82b serves to limit the maximum forward tilt and the backward tilt of the upper frame 11.

Figure 4:
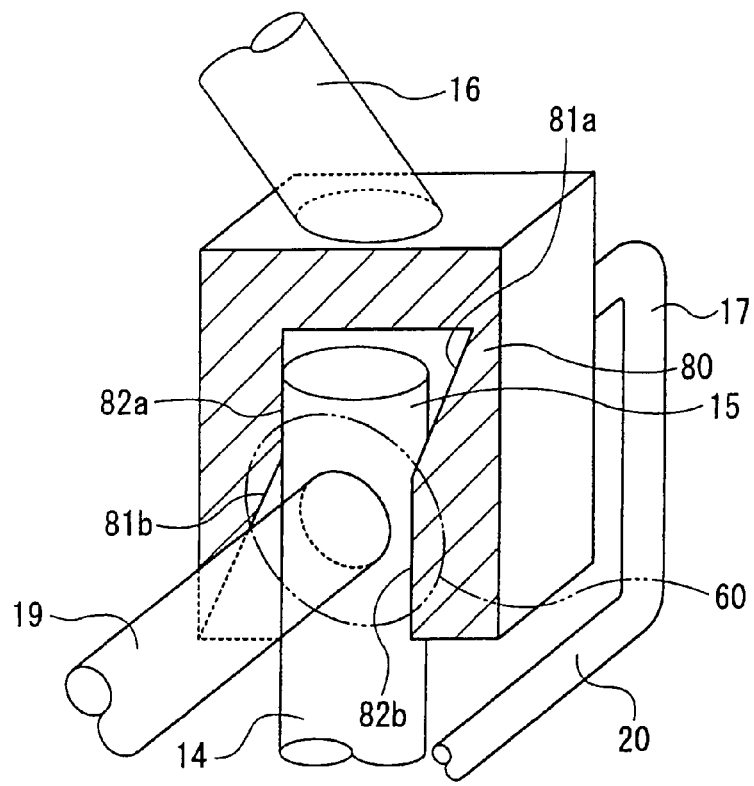
FIG. 4 is a cut-away perspective view showing the link bracket structure shown in FIG. 2.
Figure 6A:
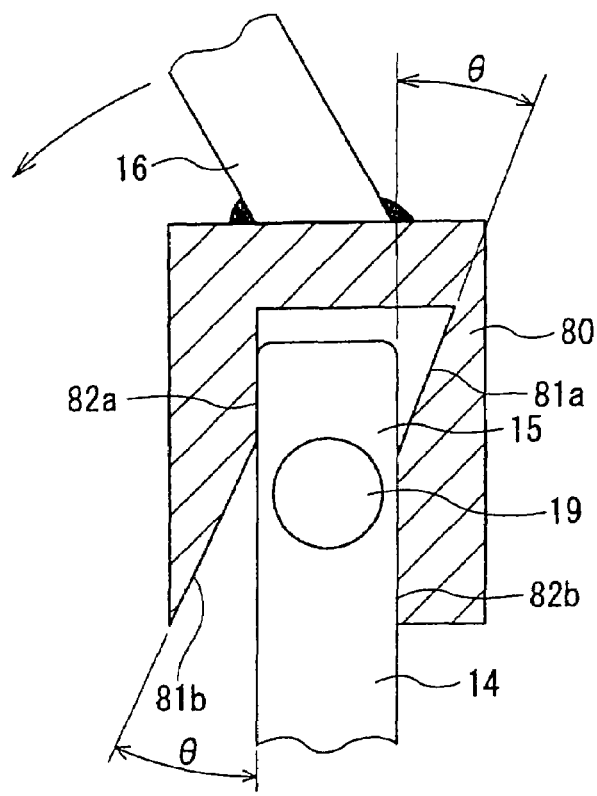
FIG. 6a is a cross-section taken along line B-B of FIG. 2 showing the upper and lower frames of the headrest device prior to rotation according to the first embodiment of the invention.

Inside the link brackets 80, as best seen in FIG. 4, the backward tilt limit surface 82a formed at the upper front side and the backward tilt limit surface 82b formed at the lower back side are both vertical, and as shown in FIG. 6a, the backward tilt limit surfaces 82a, 82b restrict the backward movement of the link bracket 80, the tilted leg section 16 fixed to the link bracket, and the headrest 4 by engaging the upper top surface and lower back surface of the upper ends 15 of the upright leg sections 14.

Figure 6B:
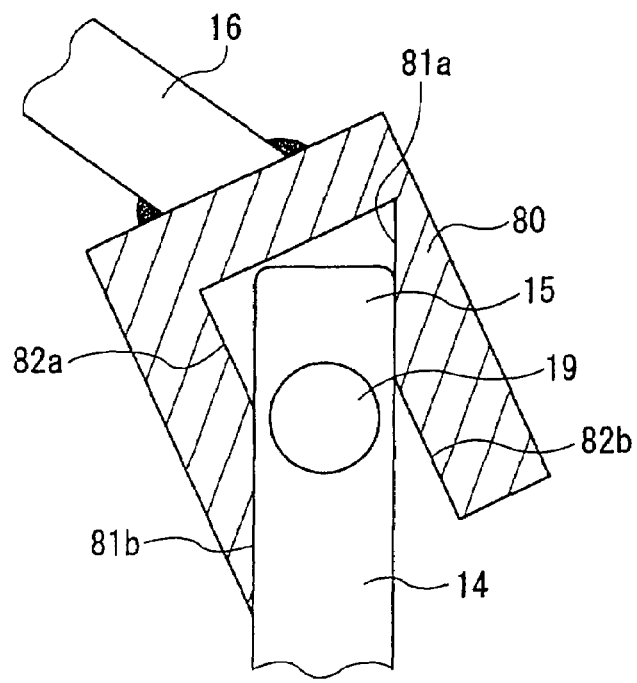
FIG. 6b is a cross-section taken along line B-B of FIG. 2 showing the upper and lower frames of the headrest device after rotation according to the first embodiment of the invention.

In the link bracket 80, the forward tilt limit surface 81b formed at the lower front side and the forward tilt limit surface 81a formed at the upper back side are parallel to one another but are disposed at a tilt angle relative to the vertical backward tilt limit surfaces 82a, 82b. As shown in FIG. 6b, when the link bracket 80, the tilted leg section 16 that is fixed to the link bracket, and the headrest 4 pivot by the tilt angle, the forward tilt limit surface 81a, 81b engage the upper back surface and lower front surface of the upper ends 15 of the upright leg sections 14, thereby restricting the forward tilt movement of the link bracket 80, the tilted leg section 16 that is fixed to the link bracket, and the headrest 4.

By adjusting the tilt angle formed between the forward tilt limit surfaces (81a, 81b) and the vertical backward tilt limit surfaces (82a, 82b), the maximum forward tilt angle of the link bracket 80, the tilted leg section 16 that is fixed to the link bracket, and the headrest 4 can be adjusted. For example, the maximum forward tilt angle can be set to 20-30 degrees for the driver seat and 40-50 degrees or 60-70 degrees for the passenger seat.

It is also possible to set the maximum forward tilt angle of the headrest 4 to 90 degrees, and by tilting the headrest 4 installed on the driver seat or the passenger seat by 90 degrees, the front view of the person sitting on the back seat can be widened.

In order to further restrain the headrest 4 against reverse rotation, an auxiliary ratchet gear 61 is connected to the side surface area of the right side link bracket 80. An auxiliary pawl 71 is disposed on the support shaft 20 for engagement with the auxiliary ratchet gear 61 and the auxiliary pawl 71, together with the pawl 70, by engaging the auxiliary ratchet gear 61, restricts the rotation of the gear wheel 50 in the direction (clockwise in FIG. 3) that makes the upper frame 11 tilt backward.

Figure 7:
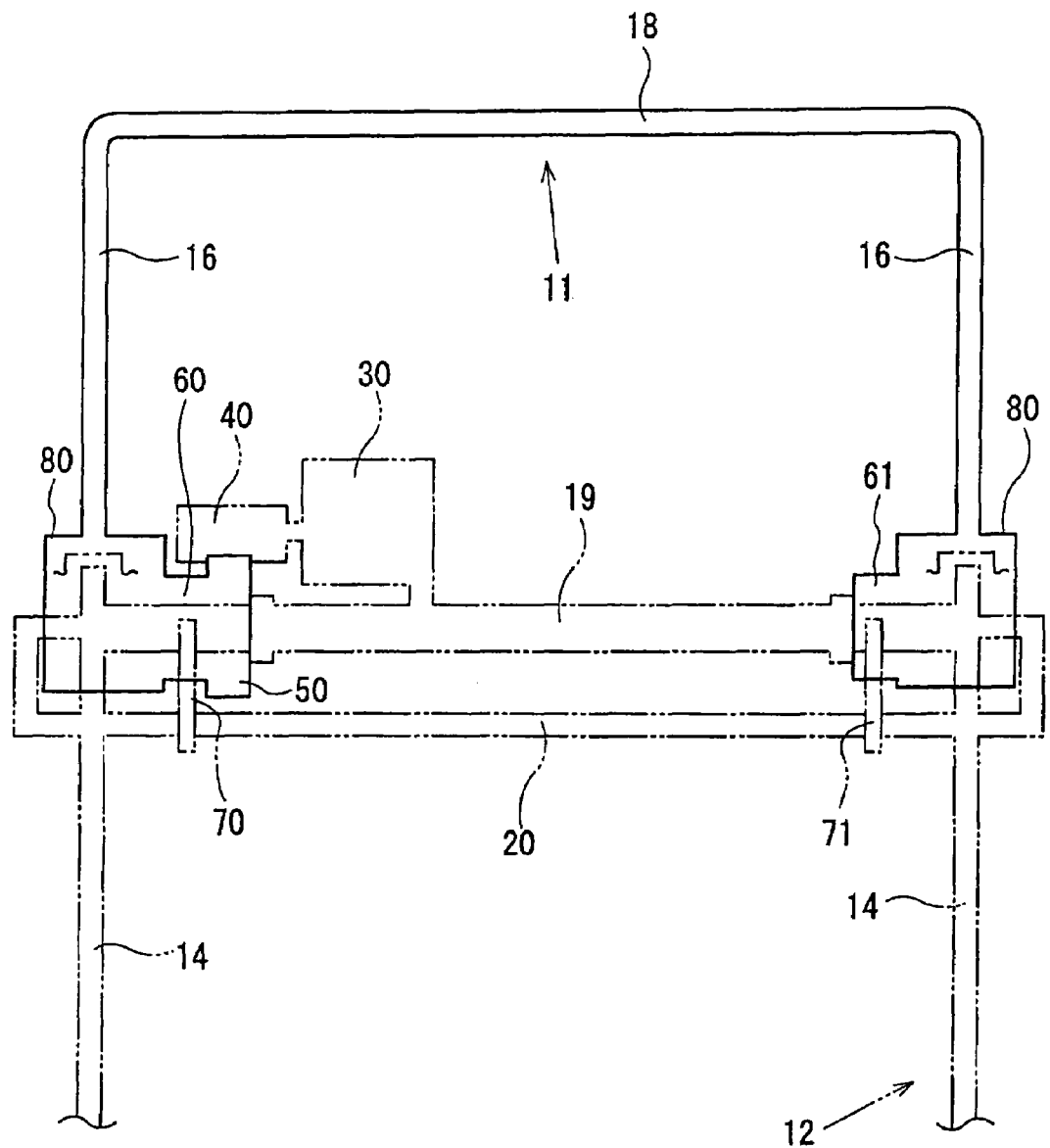
FIG. 7 is a rear view where the parts that tilt forward as one unit in the headrest device according to the first embodiment of the invention are presented in solid lines.

Thus, in the headrest device 1, the upper frame 11, the two link brackets 80, the gear wheel 50, the ratchet gear 60, and the auxiliary ratchet gear 61 are connected together as one unit so that those parts simultaneously tilt with respect to the upper ends 15 of the upright leg sections 14 of the lower frame 12, as shown by the solid lines of FIG. 7.

Figure 5:
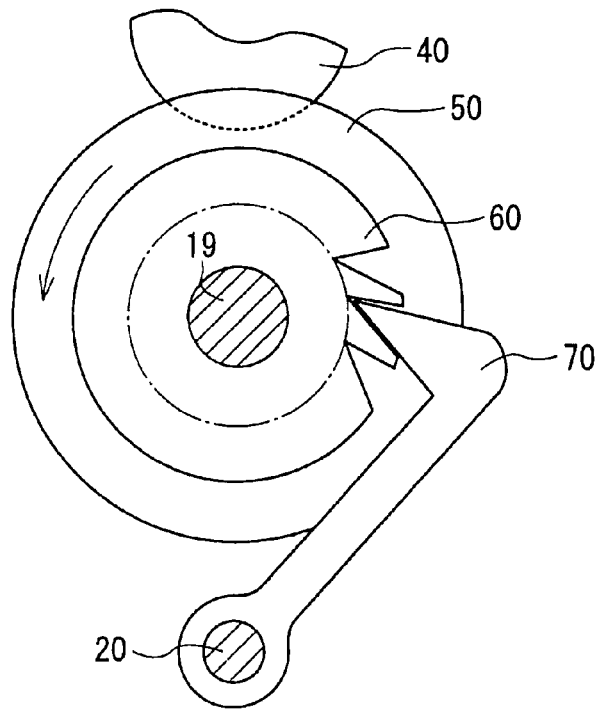
FIG. 5 is a cross-section taken along line A-A of FIG. 2.

In operation, the headrest device 1 operates to tilt the headrest 4 forward at the time of a collision. First, the sensor 2 detects the distance from the car to an adjacent vehicle, and if the detected distance is within a predetermined range indicative of an imminent collision, the CPU 3 provides an operating signal to the motor 30. In response to the operating signal provided by the CPU 3, the motor 30 rotates the worm 40, which, in turn, rotates the gear wheel 50 in the direction indicated by the arrow in FIG. 5. By the rotation of the gear wheel 50, the upper frame 11, which is connected to the gear wheel 50 by the ratchet gear 60 and the link bracket 80, is tilted forward. Accordingly, since the headrest 4 is supported by the upper frame 11, the headrest 4 also tilts forward in the direction indicated by the arrows in FIG. 3 and FIG. 6a. The forward tilt angle of the headrest 4 is set to the angle that makes the headrest stay in such a position that the back of the person's head barely touches or slightly touches the headrest 4, and the headrest 4 will not be positioned in a manner to push out the head forward. By this forward tilt of the headrest 4, the potential for extensive backward movement of the occupant's head caused by the forces experienced during a collision is mitigated, thereby reducing the degree of whiplash injury.

To make the headrest 4 tilt forward, the headrest device 1 rotates the gear wheel 50 using the motor 30 in response to an operating signal from the CPU 3. Each component of the headrest device 4 is simple and sturdy. Therefore, the invention provides a low cost headrest device 4 that is reliable and not prone to malfunction.

By the action of the ratchet gear 60 and the pawl 70, as well as the auxiliary ratchet gear 61 and the auxiliary pawl 71, reverse rotation of the gear wheel 50, that is the rotation of the gear wheel 50 that would make the upper frame 11 tilt backward (right side in FIG. 3), is restricted. Therefore, at the time of a collision, even if a person's head hits the headrest 4 strongly after the headrest 4 tilts forward, the impact of the head will not cause the head headrest 4 to tilt backward.

Furthermore, since the ratchet gears 60, 61 and the pawls 70, 71 prevent reverse rotation of the headrest 4, impact loads are not transferred to the gear wheel 50 and the worm 40, thus reducing the likelihood of failure of these components, thereby further improving the reliability of the headrest.

Because the maximum forward tilt position and the maximum backward tilt position of the upper frame 11 are provided by engagement of the front surface and the back surface of the upper portions 15 of the upright leg sections 14 with the forward tilt restricting surfaces 81a, 81b and the backward tilt restricting surfaces 82a, 82b of the link bracket 80, the headrest 4 will not tilt forward or backward more than necessary. Therefore, when a collision has occurred, the headrest 4 can support the occupant's head at its appropriate posture without tilting forward more than necessary, thereby reducing the degree of injuries such as whiplash. In addition, when the occupant's head hits the headrest 4 during a collision, in addition to the action of the pawl 70 that engages with the ratchet gear 60 fixed on the link bracket 80, the backward tilt restricting surface 82a, 82b of the link bracket 80 prevents the headrest 4 from tilting backward more than necessary.

In other words, if the forces acting upon the headrest 4 exceed the capacity of either the motor 30 or the pawl 70 to restrain the headrest 4 against tilting, the maximum degree of tilt of the headrest 4 in response to the forces of a collision will be restrained by the forward tilt restricting surfaces 81a, 81b or the backward tilt restricting surfaces 82a, 82b.

Figure 8:
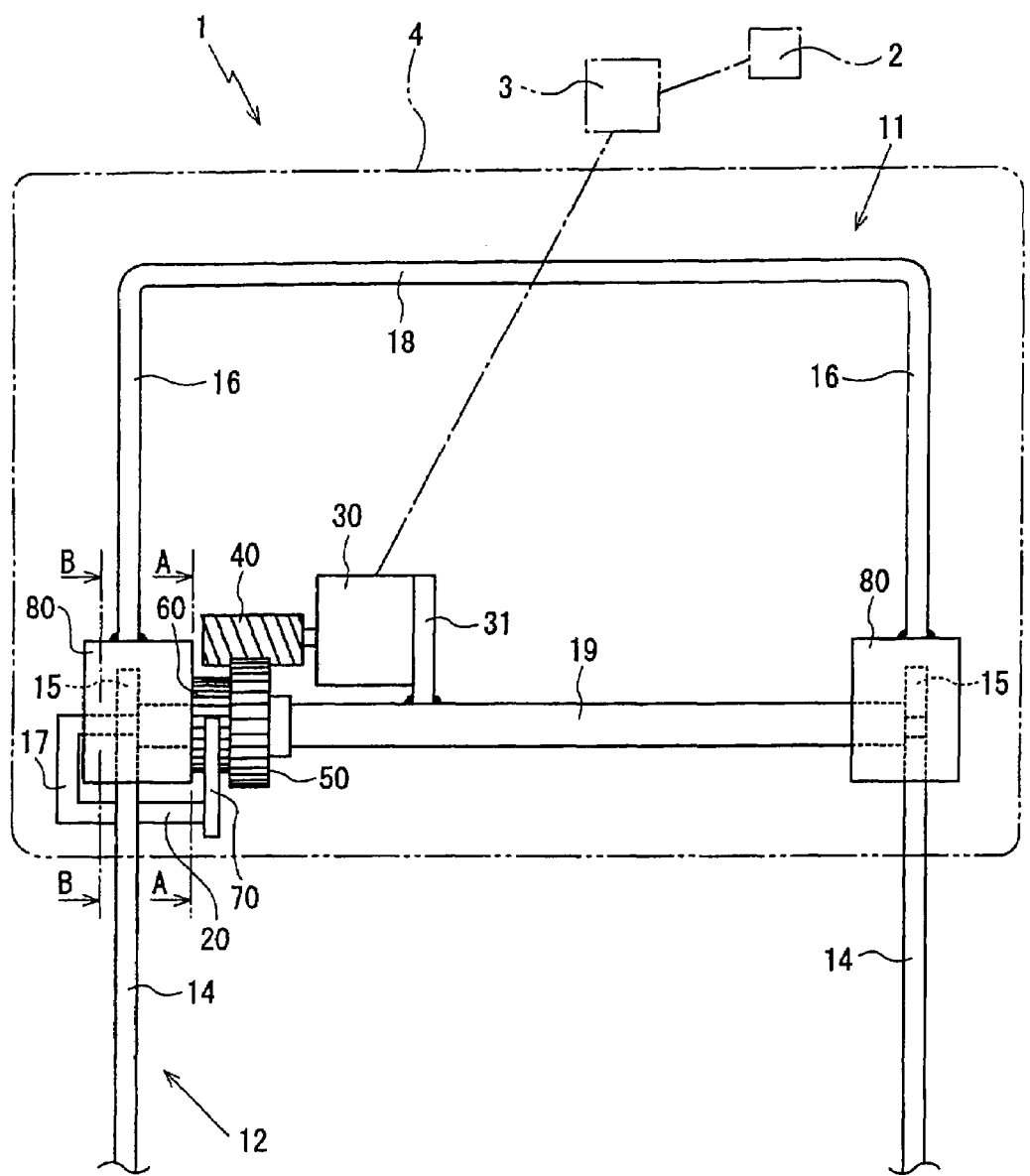
FIG. 8 is a rear view showing an alternative configuration of the headrest device according to the first embodiment of the invention.

In the first embodiment of the invention, the ratchet gear 60 and the pawl 70 are installed on the left link bracket 80, and an auxiliary ratchet gear 61 and an auxiliary pawl 71 are installed on the right link bracket. However, as shown in FIG. 8, the ratchet gear 60 and the pawl 70 may be provided on only one of the link brackets 80. In this case, the support shaft 20 does not need to extend between the two upright leg sections 14, but rather, the support shaft 20 need only extend to the location of the pawl 70.

Also, according to the first embodiment of the invention, the headrest 4 is restrained against reverse rotation by engagement of the pawl 70 with the ratchet gear 60. However, it should be appreciated that the ratchet gear 60 and pawl 70 can be eliminated if the driving force of the motor 30 is increased.

Figure 9:
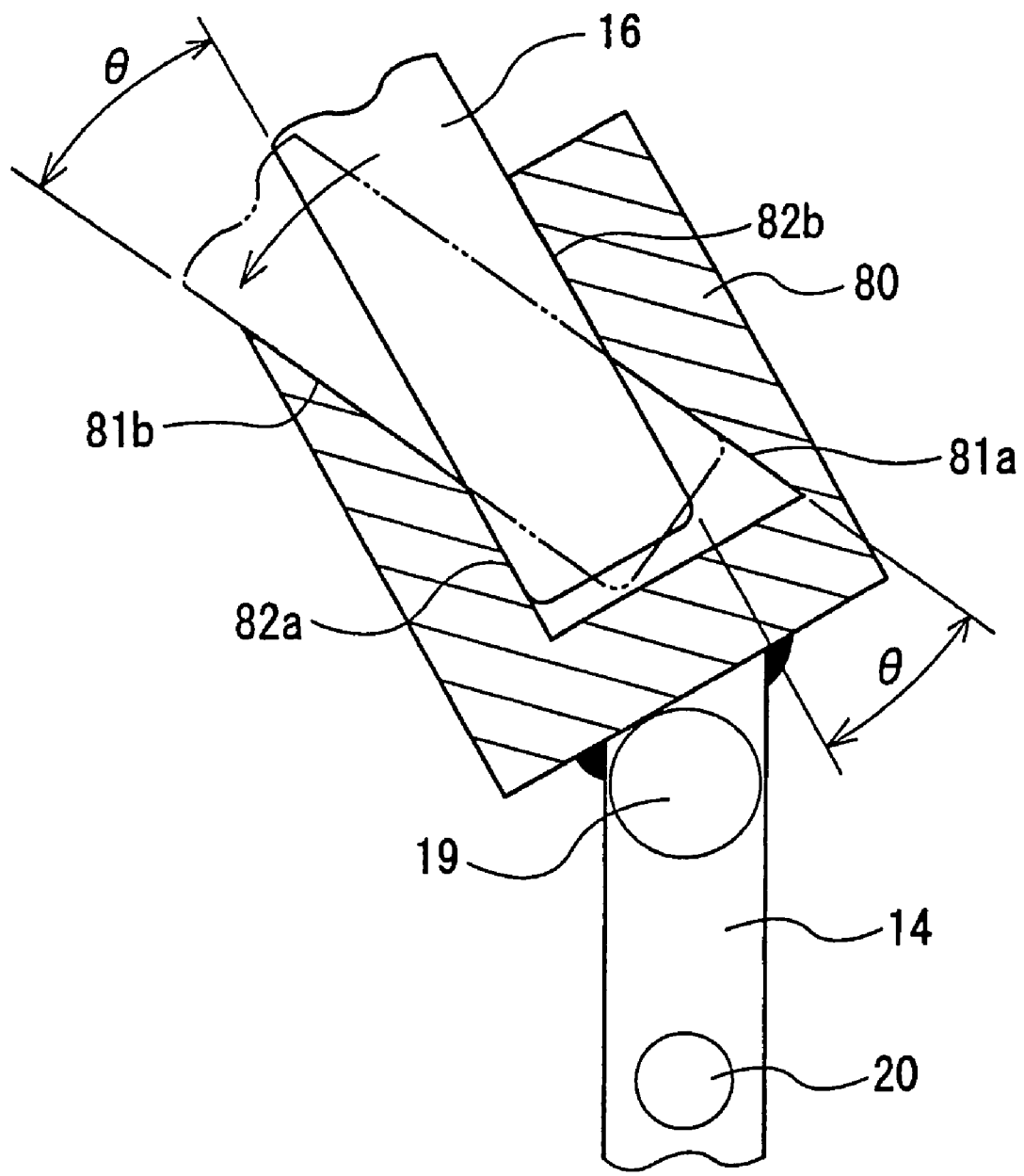
FIG. 9 is a perspective view showing the link bracket structure of another alternative configuration of the headrest device according to the first embodiment of the invention.

According to the first embodiment of the invention, the left and right link brackets 80 are connected to the lower ends of the two slanting leg sections 16 of the upper frame 11, and the upper ends 15 of the two upright leg sections 14 of the lower frame 12 are disposed within the link brackets 80. However, as shown in FIG. 9, it should be understood that the left and right link brackets 80 can be connected to the upper ends 15 of the two upright leg sections 14 of the lower frame 12, and the lower ends of the two tilted leg sections 16 of the upper frame 11 can be disposed within the link brackets 80.

In this case, the tilted leg section 16 and the headrest 4 may tilt forward by a maximum forward tilt angle defined by engagement of the upper front surface and the lower back surface of the lower ends of the tilted leg sections 16 with the forward tilt restricting surface 81b formed at the upper front side of the interior of the link bracket 80 and the forward tilt restricting surface 81a formed at the lower back side of the interior of the link bracket 80. With regard to the backward tilt of the headrest 4, the lower front surface and the upper back surface of the lower ends of the tilted leg sections 16 engage the backward tilt restricting surface 82a formed at lower front side of the interior of the link bracket 80 and the backward tilt restricting surface 82b formed at upper back side of the interior of the link bracket 80 to restrict further backward tilt of the headrest 4.

Figure 10:
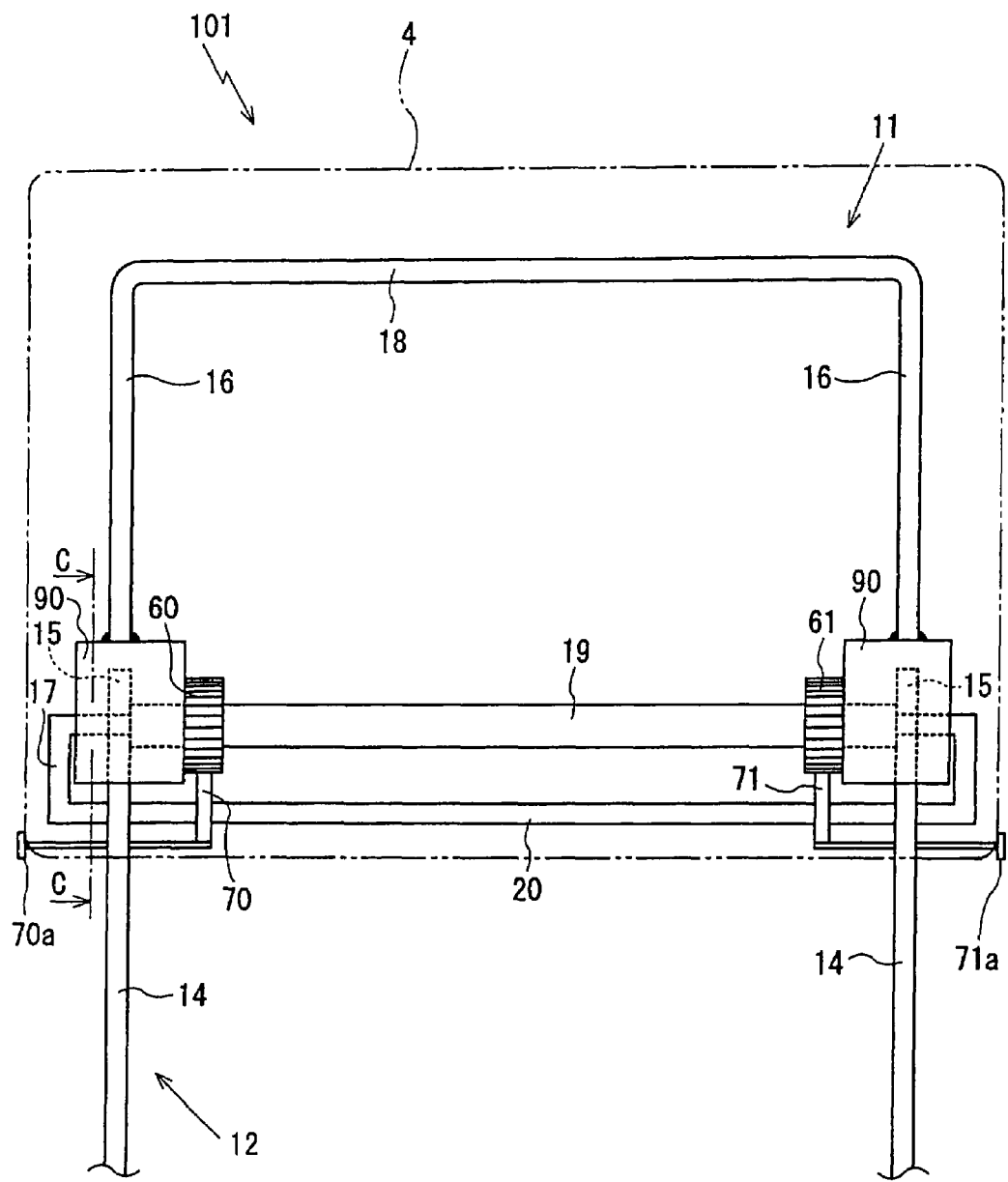
FIG. 10 is a rear view of a headrest device according to the second embodiment of the invention.
Figure 11A:
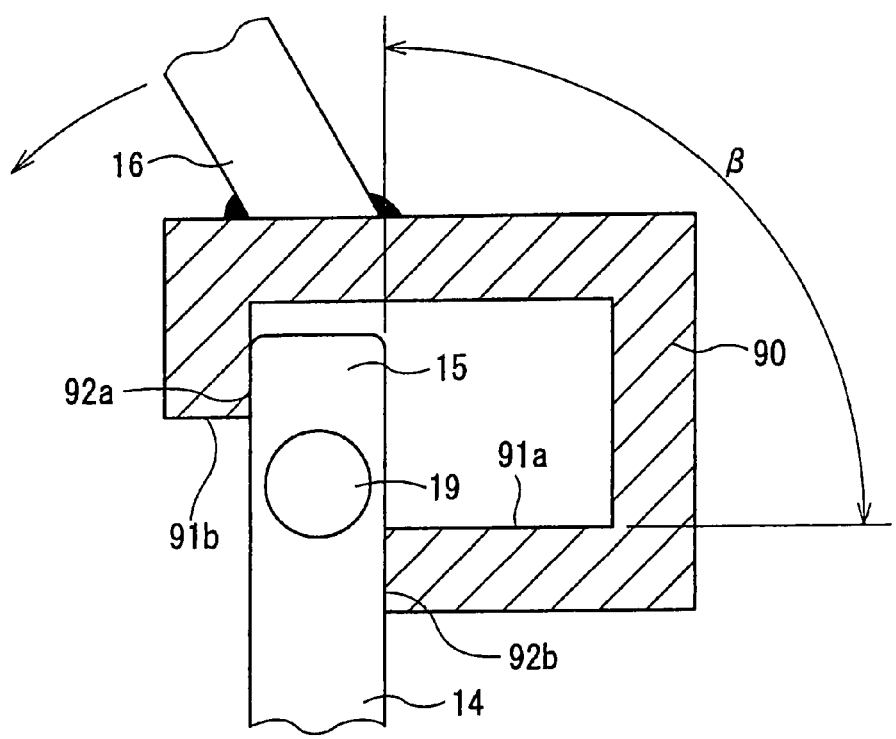
FIG. 11 is a cross-sectional view taken along line C-C of FIG. 10 showing the rotation of the upper frame of the headrest device according to the second embodiment of the invention.

A headrest device 101, according to a second embodiment of the invention, will now be described with reference to FIG. 10 and FIG. 11, wherein parts identical to those described with regard to the first embodiment bear like reference numerals.

The headrest device 101 includes the headrest 4, which is installed on the car seat 5 by the upper and lower frames 11, 12. As is the case with the first embodiment of the invention, the headrest device 101 includes the lower frame 12 that has the two upright leg sections 14 that are used to connect the headrest device 101 to the car seat 5, an upper frame 11 having two tilted leg sections 16 positioned above the connected 18 for connecting the upper ends of leg sections 16 to one another, wherein the upper frame 11 rotates freely with respect to the upper ends 15 of the upright leg sections 14 of the lower frame 12, a headrest 4 that covers the top part of said lower frame 12, and the entirety of the upper frame 11.

The headrest device 101 includes two link brackets 90 that pivotally connect the upper frame 11 to the lower frame 12. The upper ends 15 of the upright leg sections 14 of the lower frame 12 are disposed within the link brackets 90, and the lower ends of the two tiled leg sections 16 of the upper frame 11 are connected to the link brackets 90. Forward tilt restricting surfaces 91a, 91b and backward tilt restricting surfaces 92a, 92b are formed on the interior of the link brackets 90 to define the maximum backward tilt position and the maximum forward tilt position of the upper frame 11 by engaging the front surface of the upper ends 15 of the upright leg sections 14.

In addition, the headrest device 101 has a pawl 70 and an auxiliary pawl 71 that function as a freely removable stopper to prohibit forward rotation of the upper frame 11 to thereby keep the upper frame 11 at the maximum backward tilt position and also to restrict the forward tilt of the upper frame 1.

The lower frame 12 includes the two upright leg sections 14 and the horizontal bar 19, which is positioned at the top ends of the upright leg sections 14. At one end (the left side of FIG. 10) of the horizontal bar 19, a ratchet gear 60 is rotatably supported by the horizontal bar 19 and connected to the left side of the link bracket 90 by its side surface area. The ratchet gear 60 engages with the pawl 70, which is connected to the lower frame 12 to restrict the forward rotation of the upper frame 11. In order to engage and disengage pawl 70 with respect to the ratchet gear 60, a screw 70a is connected to the pawl 70. The screw 70a allows selective engagement of the pawl 70 with the ratchet gear 60 allowing the pawl 70 to function as a stopper to stop the ratchet gear 60 or to release the stop function and allow the upper frame 11 to tilt forward. The pawl 70 is installed on the support shaft 20 for rotation with respect thereto, and the support shaft 20 is connected to the left side of the horizontal bar 19 by the connection part 17.

At the other end (the right side in FIG. 10) of the horizontal bar 19, an auxiliary ratchet gear 61 is rotatably supported by the horizontal bar 19. The auxiliary ratchet gear 61 is connected to the left side of the link bracket 90 by its side surface. The auxiliary ratchet gear 61 engages the auxiliary pawl 71, which is connected to the lower frame 12 to restrict forward rotation of the upper frame 11. In order to engage and disengage auxiliary pawl 71 with respect to auxiliary ratchet gear 61, a screw 71a is connected to the auxiliary pawl 71. The screw 71a allows selective engagement of the auxiliary pawl 71 with the ratchet gear 61, allowing the auxiliary pawl 71 to function as a stopper to stop the auxiliary ratchet gear 61 or to release the stop function and allow the upper frame 11 to tilt forward. Similar to the pawl 70, the auxiliary pawl 71 is installed on a support shaft 20 for rotation with respect thereto, and the support shaft 20 is connected to the left side of the horizontal bar 19 by the connection part 17.

In the link bracket 90, as best seen in 11A-11B, the backward tilt restricting surface 92a formed at upper front side and the backward tilt restricting surface 92b formed at lower back side are substantially parallel to one another and substantially vertical when the upper frame 12 is not rotated with respect to the lower frame 11. The backward tilt restricting surface 92a, 92b engage the upper ends 15 of the upright leg sections 14 to restrain the linking bracket 90 against tilting backward tilt of the link bracket 90, thus also restraining the tilted leg section 16, which is fixed to the link bracket 90, and the headrest 4, which is supported by the tilted leg section 16.

Furthermore, the pawl 70 and the auxiliary pawl 71 function to restrain motion of the upper frame 11, by engaging the ratchet gear 60 and the auxiliary ratchet gear 61, respectively, thus restricting the forward tilt of the upper frame 11 and preventing the upper frame 11 from exceeding its backward tilt limit position.

Figure 11B:
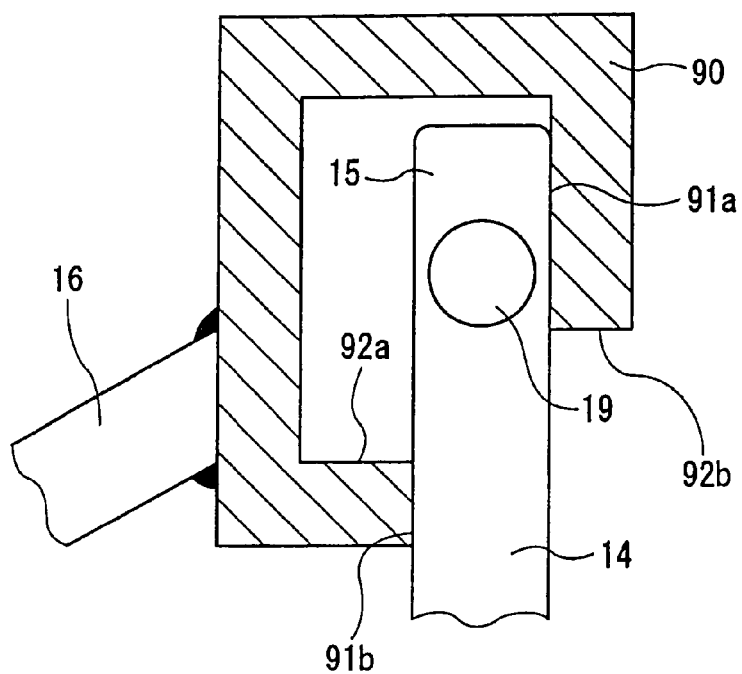

Inside the link bracket 90, the forward tilt restricting surface 91b formed at lower front side and the forward tilt restricting surface 91a formed at upper back side are substantially parallel, and they an angle β of to the vertical backward tilt restricting surfaces 92a, 92b, the angle β being 90 degrees in this example. As shown in FIG. 11b, when the link bracket 90, the tilted leg section 16 that is fixed to the link bracket 90, and the headrest 4 make a forward tilt by the angle β (here it is 90 degrees), the forward tilt restricting surface 91a and the forward tilt restricting surface 91b come into contact with the upper back surface and the lower front surface of the upper ends 15 of the upright leg sections 14, thus restraining the link bracket 90, the tilted leg section 16, which is fixed to the link bracket 90, and the headrest 4, which is supported by the tilted leg section 16, against tilting forward.

Here, since the tilted leg section 16 of the upper frame 11 is tilted forward with respect to the link bracket 90, if the headrest 4 is pushed forward by 90 degrees, the headrest 4 goes below the upper surface of the seat.

Thus, if the headrest 4 of an unoccupied seat is tilted forward by 90 degrees, the rear view for the driver is greatly improved, and if the headrest 4 of an unoccupied passenger seat is tilted forward by 90 degrees, the front view of those sitting in the back seat and the side view of the driver are greatly improved. In case if there are three rows of seat in a car, by tilting forward the headrest 4 of an unoccupied middle row seat by 90 degrees, the view both from the back and the front is greatly improved.

When a person sits on the seat with this headrest device 101 installed, the pawls 70, 71 function to restrict the forward tilt of the upper frame 11 to make the upper frame 11 stay at the backward tilt limit position by engagement of the pawl 70 and the auxiliary pawl 71 with the ratchet gear 60 and the auxiliary ratchet gear 61, respectively. Thus, the headrest 4 is kept at a stable posture because the pawls 70, 71 function to restrict the forward tilt movement and the link bracket 90 functions to restrict the backward tilt movement.

By the adjustment of the angle β that is formed between the backward tilt restricting surfaces 92a, 92b and the forward tilt restricting surfaces 91a, 91b, the forward tilt limit angle can be adjusted (for example making it bigger than 90 degrees) for the link bracket 90, the tilted leg section 16 fixed to the link bracket and the headrest 4.

In the second mode of this invention, the ratchet gear 60 and the complementary pawl 70 are connected to the left side link bracket 90, while the auxiliary ratchet gear 61 and the complementary auxiliary pawl 71 are connected to the right side link bracket 90 for balanced operation of the headrest 4.

However, as is the case with the first mode of invention, it is possible to install only the ratchet gear 60 and the pawl 70 on either of the link brackets 90 while omitting the auxiliary ratchet gear 61 and the auxiliary pawl 71 from the other link bracket 90. In such a case, the support shaft 20 need not extend between the upright leg sections 14, but can be shortened, as shown in FIG. 8.

In the second mode of this invention, the left and right link brackets 90 are fixed to the lower portion of the two tilted leg sections 16 of the upper frame, and the upper ends 15 of the two upright leg sections 14 of the lower frame 12 are contained in the link brackets 90. However, as shown in FIG. 9 for the first mode of invention, it should be understood that the left and right link brackets 90 can be fixed to the upper ends 15 of two upright leg sections 14 of the lower frame 12, and the lower portion of the tilted leg sections 16 of the upper frame can be included in the link brackets 90.

The invention claimed is:

1. A headrest device for supporting a headrest with respect to a seat, comprising:
   a lower frame connectable to the seat;
   an upper frame for supporting the headrest thereon;
   a pair of link brackets connecting said lower frame to said upper frame for pivotal motion of said upper frame with respect to said lower frame through a limited range of motion between a forward tilt limit position and a rearward tilt limit position; and
   a motor operatively connected to a link bracket of said pair of link brackets to move said upper frame between said forward tilt limit position and said rearward tilt limit position in response to a control signal.

2. The headrest device stated in claim 1, further comprising:
   a controller for determining when a collision is imminent and generating said control signal in response thereto.

3. The headrest device stated in claim 1, further comprising:
   a horizontal bar rigidly connected to either said upper frame or said lower frame;
   a gear disposed upon said horizontal bar for rotation with respect thereto and rigidly connected to said link bracket, and said gear operatively connected to said motor for rotation thereby;
   a ratchet gear fixed coaxially to said gear; and
   a pawl engageable with said ratchet gear for restricting said upper frame against pivoting with respect to said lower frame toward said rearward tilt limit position.

4. The headrest device stated in claim 2, further comprising:
   a worm connected to said motor and in engagement with said gear for rotating said gear in response to rotation of said motor.

5. A headrest device for supporting a headrest with respect to a seat, comprising:
   a frame having at least a first leg section and a second leg section for connecting the headrest to the seat;
   at least one link bracket for connecting said first leg section to said second leg section, said link bracket rigidly connected to said first leg section and said second leg section pivotally disposed within said link bracket for pivotal motion of said first leg section with respect to said second leg section through a restricted range of motion between a forward tilt limit position, wherein said second leg section engages said link bracket to prevent further forward tilt of said headrest, and a rearward tilt limit position, wherein said second leg section engages said link bracket to prevent further rearward tilt of said headrest; and
   a motor for pivoting said first leg section with respect to said second leg section between said forward tilt limit position and said rearward tilt limit position in response to a control signal.

6. The headrest device stated in claim 5, further comprising:
   a controller for determining when a collision is imminent and generating said control signal in response thereto.

7. The headrest device stated in claim 5, further comprising:
   a horizontal bar rigidly connected to said second leg section;
   a gear disposed upon said horizontal bar for rotation with respect thereto and rigidly connected to said link bracket, and said gear operatively connected to said motor for rotation thereby;
   a ratchet gear fixed coaxially to said gear; and
   a pawl engageable with said ratchet gear for restricting said first leg section against pivoting with respect to said second leg section toward said rearward tilt limit position.

8. The headrest device stated in claim 7, further comprising:
   a worm connected to said motor and in engagement with said gear for rotating said gear in response to rotation of said motor.

9. A headrest device for supporting a headrest with respect to a seat, comprising:
   a plurality of leg sections for connecting the headrest to the seat, said plurality of leg sections including at least a first leg section, a second leg section, a third leg section, and a fourth leg section;
   a pair of link brackets for pivotally connecting said first leg and second leg sections to said third and fourth leg sections, each link bracket of said pair of link brackets having a first pair of opposing engagement surfaces and a second pair of opposing engagement surfaces, a first link bracket of said pair of link brackets rigidly connected to said first leg section and having said third leg section pivotally disposed therein, and a second link bracket of said pair of link brackets rigidly connected to said second leg section and having said fourth leg section pivotally disposed therein,
   wherein said first leg section and said second leg section pivot with respect to said third leg section and said fourth leg section between a forward tilt limit position, wherein said third leg section engages said first pair of opposing engagement surfaces of said first link bracket and said fourth leg section engages said first pair of opposing engagement surfaces of said second link bracket, and a rearward tilt limit position, wherein said third leg section engages said second pair of opposing engagement surfaces of said first link bracket and said fourth leg section engages said second pair of opposing engagement surfaces of said second link bracket; and
   a motor for pivoting said first leg section and said second leg section with respect to said third leg section and said fourth leg section between said forward tilt limit position and said rearward tilt limit position in response to a control signal.

10. The headrest device stated in claim 9, wherein the engagement surfaces of said first pair of opposing engagement surfaces are parallel to one another and the engagement surfaces of said second pair of opposing engagement surfaces are parallel to one another.

11. The headrest device stated in claim 9, wherein said first pair of opposing engagement surfaces are disposed at an angle with respect to said second pair of opposing engagement surfaces.

12. The headrest device stated in claim 9, wherein said first pair of opposing engagement surfaces are substantially perpendicular to said second pair of opposing engagement surfaces.

13. The headrest device stated in claim 9, further comprising:
  a controller for determining when a collision is imminent and generating said control signal in response thereto.

14. The headrest device stated in claim 13, further comprising:
  an auxiliary ratchet gear fixed to said second link bracket; and
  an auxiliary pawl engageable with said auxiliary ratchet gear for restricting said first leg section and said second leg section against pivoting with respect to said third leg section and said fourth leg section toward said rearward tilt limit position.

15. The headrest device stated in claim 13, further comprising:
  a worm connected to said motor and in engagement with said gear for rotating said gear in response to rotation of said motor.

16. The headrest device stated in claim 9, further comprising:
  a horizontal bar rigidly connected to and extending between said third leg section and said fourth leg section;
  a gear disposed upon said horizontal bar for rotation with respect thereto and rigidly connected to said first link bracket, and said gear operatively connected to said motor for rotation thereby;
  a ratchet gear fixed coaxially to said gear; and
  a pawl engageable with said ratchet gear for restricting said first leg section and said second leg section against pivoting with respect to said third leg section and said fourth leg section toward said rearward tilt limit position.

* * * * *